(12) United States Patent
Otake

(10) Patent No.: US 10,044,830 B2
(45) Date of Patent: Aug. 7, 2018

(54) INFORMATION SYSTEM, CONTROL APPARATUS, METHOD OF PROVIDING VIRTUAL NETWORK, AND PROGRAM

(75) Inventor: Takahiro Otake, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 232 days.

(21) Appl. No.: 13/976,721

(22) PCT Filed: Dec. 27, 2011

(86) PCT No.: PCT/JP2011/080181
§ 371 (c)(1),
(2), (4) Date: Jun. 27, 2013

(87) PCT Pub. No.: WO2012/090996
PCT Pub. Date: Jul. 5, 2012

(65) Prior Publication Data
US 2013/0282867 A1    Oct. 24, 2013

(30) Foreign Application Priority Data

Dec. 28, 2010 (JP) ................................ 2010-292014

(51) Int. Cl.
*G06F 15/16* (2006.01)
*H04L 29/08* (2006.01)
(Continued)

(52) U.S. Cl.
CPC .......... *H04L 67/32* (2013.01); *H04L 12/4625* (2013.01); *H04L 12/4641* (2013.01);
(Continued)

(58) Field of Classification Search
CPC ..... H04L 12/4641; H04L 67/32; H04L 45/64; H04L 12/4625; H04L 45/38
See application file for complete search history.

(56) References Cited

U.S. PATENT DOCUMENTS

| 6,519,634 B1 | 2/2003 | Song et al. |
| 7,668,164 B2 * | 2/2010 | Jonsson .................. H04L 45/04 370/392 |

(Continued)

FOREIGN PATENT DOCUMENTS

| CN | 1261232 A | 7/2000 |
| EP | 1615389 A1 | 1/2006 |

(Continued)

OTHER PUBLICATIONS

Masashi Numata, et al, "Study for building of Virtual Tenant Network", Proceedings of the 2010 IEICE General Conference, Tsushin 2, Mar. 2, 2010, B-6-44, p. 44.

(Continued)

*Primary Examiner* — Moustafa M Meky
*Assistant Examiner* — Kidest Mendaye
(74) *Attorney, Agent, or Firm* — Sughrue Mion, PLLC

(57) ABSTRACT

An information system of the present invention includes a plurality of physical nodes each of which processes a packet received from external node(s) according to a processing rule (packet handling operation) that associates a matching rule for identifying a flow and processing content to be applied to a packet that matches the matching rule, and a control apparatus which sets the processing rule in each of the plurality of physical nodes, thereby causing the plurality of physical nodes to operate as virtual nodes on a virtual network(s) usable by the external node(s). The control apparatus includes a first storage unit defining a correspondence relationship between each of the plurality of physical nodes and virtual network(s), and a second storage unit defining a correspondence relationship between each of the external node(s) and virtual node(s) on virtual network(s). The control apparatus determines the virtual network(s) and the virtual node(s) to which the external node(s) is to be (Continued)

connected, based on information on the physical node(s) to which the external node is connected and information on the external node(s).

25 Claims, 17 Drawing Sheets

(51) Int. Cl.
*H04L 12/46* (2006.01)
*H04L 12/721* (2013.01)
*H04L 12/715* (2013.01)
*H04L 12/751* (2013.01)

(52) U.S. Cl.
CPC .............. *H04L 45/38* (2013.01); *H04L 45/64* (2013.01); *H04L 45/02* (2013.01)

(56) References Cited

U.S. PATENT DOCUMENTS

| | | | |
|---|---|---|---|
| 9,203,747 B1* | 12/2015 | Brandwine | ............. H04L 45/02 |
| 2007/0237161 A1 | 10/2007 | Akisada | |
| 2009/0328193 A1* | 12/2009 | Moore | .................... G06F 21/53 726/15 |
| 2010/0228946 A1* | 9/2010 | Byers | .................... H04L 12/462 711/209 |
| 2010/0232290 A1* | 9/2010 | Wong | .................... H04L 12/24 370/229 |
| 2010/0257263 A1* | 10/2010 | Casado | .................. H04L 49/00 709/223 |
| 2010/0278069 A1* | 11/2010 | Sharma | .................. H04L 45/02 370/254 |
| 2011/0004687 A1* | 1/2011 | Takemura | ............. G06F 9/5061 709/226 |
| 2011/0243134 A1* | 10/2011 | Armstrong | .............. H04L 45/66 370/392 |
| 2012/0089707 A1* | 4/2012 | Baba | ..................... H04L 41/022 709/220 |

FOREIGN PATENT DOCUMENTS

| | | |
|---|---|---|
| JP | 2010-200026 A | 9/2010 |
| WO | 2008/095010 A1 | 8/2008 |
| WO | 2010037420 A1 | 4/2010 |

OTHER PUBLICATIONS

"OpenFlow Switch Specification" Version 1.0.0 (Wire Protocol 0x01), [Searched on Dec. 1, Heisei 22 (2010)], Internet <URL: http://www.openflowswitch.org/documents/openflow-spec-v1.0.0.pdf>.
Nick McKeown, et al., OpenFlow: Enabling Innovation in Campus Networks, [on line], [Searched on Dec. 1, Heisei 22 (2010)], Internet <URL: http://www.openflowswitch.org/documents/openflow-wp-latest.pdf>.
International Search Report for PCT/JP2011/080181, dated Mar. 13, 2012.
European Search Report dated May 9, 2014 from the European Patent Office in counterpart European application No. 11854027.7.
Hideyuki Shimonishi et al: "Building Hierarchical Switch Network Using OpenFlow" (XP031593121) Nov. 4, 2009, pp. 391-394.
Hideyuki Shimonishi et al: "Virtualized network infrastructure using OpenFlow" (XP031690721) Apr. 19, 2010, pp. 74-79.
Decision of Rejection dated Apr. 27, 2017 issued by the State Intellectual Property Office in counterpart in No. 201180063353.0.

* cited by examiner

FIG.4

| MATCHING RULE | PROCESSING CONTENT (ACTION) |
|---|---|
| FLOW A | OUTPUT FROM PORT #1 |
| FLOW B | REWRITE DESTINATION MAC ADDRESS AND OUTPUT FROM PORT #2 |
| .. | .. |
| | |

102A

| PHYSICAL NETWORK POSITION INFORMATION | VIRTUAL NODE | | | |
|---|---|---|---|---|
| VIRTUAL NETWORK ID VIRTUAL NODE ID | VIRTUAL NODE OBJECT | | | |
| .. | .. | | | |
| .. | .. | | | |

FIG.8

| PHYSICAL NETWORK POSITION INFORMATION | PHYSICAL NETWORK POSITION INFORMATION | | | 2081A |
|---|---|---|---|---|
| PHYSICAL NODE ID PHYSICAL PORT ID (VLAN-TAG) | VIRTUAL NETWORK ID VIRTUAL NODE ID VIRTUAL INTERFACE ID | | | |
| .. | .. | | | |
| .. | .. | | | |

FIG.9

| EXTERNAL NODE INFORMATION | PHYSICAL NETWORK POSITION INFORMATION | | | 2082A |
|---|---|---|---|---|
| MAC ADDRESS | VIRTUAL NODE ID VIRTUAL INTERFACE ID | | | |
| NETWORK ADDRESS | .. | .. | | |
| | .. | | | |

FIG.10

| PHYSICAL NETWORK POSITION INFORMATION | VIRTUAL NETWORK INFORMATION | | | 2083A |
|---|---|---|---|---|
| | VIRTUAL NETWORK ID | | | |
| PHYSICAL NODE ID PHYSICAL PORT ID (VLAN-TAG) | | .. | .. | |
| | | .. | .. | |

FIG.17

HEADER FIELDS; MATCHING RULE

| Wildcards | In Port | Ether SA | Ether DA | Ether type | VLAN ID | VLAN PCP | IP SA | IP DA | IP proto | IP ToS bits | TCP/UDP src port | TCP/UDP dst port | Counters | Actions |

# INFORMATION SYSTEM, CONTROL APPARATUS, METHOD OF PROVIDING VIRTUAL NETWORK, AND PROGRAM

CROSS REFERENCE TO RELATED APPLICATIONS

This application is a National Stage of International Application No. PCT/JP2011/080181 filed Dec. 27, 2011, claiming priority based on Japanese Patent Application No. 2010-292014 filed Dec. 28, 2010, the contents of all of which are incorporated herein by reference in their entirety.

TECHNICAL FIELD

The present invention relates to an information system, a control apparatus, a method of providing a virtual network, and a program. More specifically, the invention relates to an information system configured using a forwarding node for processing a received packet according to a processing rule (packet handling operation) which matches the received packet, a control apparatus, a method of providing a virtual network, and a program.

BACKGROUND

In recent years, the technology called OpenFlow (OpenFlow) is proposed (refer to Patent Literature 1, and Non Patent Literatures 1 and 2). In the OpenFlow, communication is treated as an end-to-end flow, and path control, failure recovery, load distribution, and optimization are performed on a per-flow basis. An OpenFlow switch specified in Non Patent Literature 2 includes a secure channel for communication with an OpenFlow controller corresponding to a control apparatus. The OpenFlow switch operates according to a flow table in which appropriate adding or rewriting is instructed by the OpenFlow controller. In the flow table, a set of a matching rule (Header Fields) to be matched against a packet header, flow statistics information (Counters), and actions (Actions) defining processing content is defined for each flow (refer to FIG. 17).

When the OpenFlow switch receives a packet, the OpenFlow switch searches the flow table for an entry having a matching rule that matches header information of the received packet (refer to the header fields in FIG. 17). When the entry that matches the received packet is found as a result of the search, the OpenFlow switch updates the flow statistics information (one or more counters), and executes processing content (e.g., transmission of the packet from a specified port, flooding of the packet, discarding of the packet, or the like) described in the action field of the entry. On the other hand, when the entry that matches the received packet is not found as a result of the search, the OpenFlow switch forwards the received packet to the OpenFlow controller through the secure channel, and requests the OpenFlow controller to determine a path of the packet, based on the transmission source and the transmission destination of the received packet. The OpenFlow switch receives a flow entry for implementing this path, and then updates the flow table. In this manner, the OpenFlow switch performs packet forwarding by using an entry stored in the flow table as a processing rule (packet handling operation).

PATENT LITERATURE (PTL)

[PTL 1]
International Publication No. WO2008/095010

NON PATENT LITERATURE (NPL)

NPL 1
Nick McKeown and seven other authors, "OpenFlow: Enabling Innovation in Campus Networks, [on line], [Searched on December 1, Heisei 22 (2010)], Internet, openflowswitch.org).
NPL 2
"OpenFlow Switch Specification" Version 1.0.0 (Wire Protocol 0x01), [Searched on December 1, Heisei 22 (2010)], Internet, (openflowswitch.org).

SUMMARY

Each disclosure of the above-listed Patent Literature and Non Patent Literatures is incorporated herein by reference. The following analysis is given by the present invention.

Example 2 on page 5 in Non Patent Literature 1 describes that a virtual network such as a VLAN (Virtual Local Area Network) can be provided by using the OpenFlow system as mentioned above. As a method of identifying a user traffic in that case, Example 2 describes identification of the individual user traffic by using the port or MAC (Media Access Control) address of the OpenFlow switch, and describes provision of an appropriate VLAN ID to the OpenFlow switch, user authorization by the controller, and consideration of the location of a user when the VLAN ID is provided.

The above-mentioned Non Patent Literature 1, however, just discloses the method of providing the VLAN ID (or determining the virtual network), and does not mention provision of the OpenFlow switch for use by the user by causing the OpenFlow switch to operate as a virtual node or a virtual front end system on the virtual network.

Association between a physical node such as the OpenFlow switch (hereinafter referred to as the "physical node") and a virtual node is problematic especially when providing the virtual network. When the physical node (or the interface of the physical node) is statically associated in a one-to-one correspondence with the virtual node (or the interface of the virtual node), there is a problem that a user movement cannot be accommodated until the correspondence relationship is updated. There is also a problem that the correspondence relationship between the physical node and the virtual node must be updated whenever the configuration of the network is changed.

It is an object of the present invention to provide a configuration and a method capable of dynamically and easily associating a physical node and a virtual node in an information system represented by OpenFlow where a control apparatus controls a plurality of physical nodes.

According to a first aspect, there is provided an information system comprising:
a plurality of physical nodes each of which processes a packet received from one of one or more external nodes according to a processing rule (packet handling operation) that associates a matching rule for identifying a flow and processing content to be applied to a packet that matches the matching rule; and
a control apparatus which sets the processing rule in each of the plurality of physical nodes, thereby causing the plurality of physical nodes to operate as virtual nodes on a virtual network that may be used by the one or more external nodes. The control apparatus comprises:
a first storage unit which defines a correspondence relationship between each of the plurality of physical nodes and one of one or more virtual networks; and a second storage unit which defines a correspondence relationship between each of the one or more external nodes and a virtual node on one of the one or more virtual networks;

The control apparatus determines the virtual network(s) and the virtual node(s) to which the one of the one or more external nodes is (are) to be connected, based on information on the physical node(s) to which the external node(s) is connected and information on the external node(s).

According to a second aspect, there is provided a control apparatus. The control apparatus is connected to a plurality of physical nodes each of which processes a packet received from one of one or more external nodes according to a processing rule (packet handling operation) that associates a matching rule for identifying a flow and processing content to be applied to a packet that matches the matching rule. The control apparatus comprises:

a first storage unit that defines a correspondence relationship between each of the plurality of physical nodes and one of one or more virtual networks; and a second storage unit that defines a correspondence relationship between each of the one or more external nodes and a virtual node on one of the one or more virtual networks.

The control apparatus determining the virtual network(s) and the virtual node(s) to which the one of the one or more external nodes is to be connected, based on information on the physical node(s) to which the external node(s) is connected and information on the external node(s);

The control apparatus sets the processing rule in each of the plurality of physical nodes including the physical node(s) corresponding to the virtual node(s), thereby causing the plurality of the physical nodes to operate as virtual nodes on the virtual network that may be used by the one or more external nodes.

According to a third aspect, there is provided a method of providing a virtual network. The method comprises using a control apparatus connected to a plurality of physical nodes each of which processes a packet received from one of one or more external nodes according to a processing rule (packet handling operation) that associates a matching rule for identifying a flow and processing content to be applied to a packet that matches the matching rule. The method comprises the steps of:

determining the virtual network(s) and the virtual node(s) to which the one of the one or more external nodes is to be connected, based on information on the physical node(s) to which the external node(s) is connected and information on the external node(s) by referring to a first storage unit which defines a correspondence relationship between each of the plurality of physical nodes and one of one or more virtual networks and a second storage unit which defines a correspondence relationship between each of the one or more external nodes and a virtual node(s) on one of the one or more virtual networks; and causing the plurality of physical nodes to operate as virtual nodes on the virtual network that may be used by the one or more external nodes by setting the processing rule in each of the plurality of physical nodes including the physical node(s) corresponding to the virtual node(s). This method is associated with a specific machine, which is the control apparatus that sets the processing rule in each of the plurality of physical nodes.

According to a fourth aspect, there is provided a program for causing a computer constituting a control apparatus, the control apparatus being connected to a plurality of physical nodes each of which processes a packet received from one of one or more external nodes according to a processing rule (packet handling operation) that associates a matching rule for identifying a flow and processing content to be applied to a packet that matches the matching rule. The control apparatus comprises:

a first storage unit that defines a correspondence relationship between each of the plurality of physical nodes and one of one or more virtual networks; and a second storage unit that defines a correspondence relationship between each of the one or more external nodes and a virtual node on one of the one or more virtual networks. The program causes the computer to execute processes of:

determining the virtual network(s) and the virtual node(s) to which the one of the one or more external nodes is to be connected, based on information on the physical node(s) to which the external node(s) is connected and information on the external node(s); and causing the plurality of physical nodes to operate as virtual nodes on the virtual network(s) that may be used by the one or more external nodes by setting the processing rule in each of the plurality of physical nodes including the physical node(s) corresponding to the virtual node(s). This program can be recorded in a computer readable recording medium. That is, the present invention can also be embodied as a computer program product.

The meritorious effects of the present invention are summarized as follows.

According to the present disclosure, even if each physical node(s) and virtual node(s) are not associated in a one-to-one correspondence relationship, the virtual node(s) to be treated as having an external node(s) connected thereto can be determined, and a service using the virtual network starting from the virtual node can be provided.

BRIEF DESCRIPTION OF DRAWINGS

FIG. 4 is a table for explaining a processing rule held in the physical node in the first exemplary embodiment of the present invention.

FIG. 8 is a table for explaining physical-virtual position conversion information held in the physical-virtual conversion information storage unit of the control server in the first exemplary embodiment of the present invention.

FIG. 9 is a table for explaining external node-virtual position conversion information held in the physical-virtual conversion information storage unit of the control server in the first exemplary embodiment of the present invention.

FIG. 10 is a table for explaining physical position-virtual network conversion information held in the physical-virtual conversion information storage unit of the control server in the first exemplary embodiment of the present invention.

FIG. 17 is a diagram showing a configuration of a flow entry described in Non Patent Literature 2.

PREFERRED MODES

Figure 1:
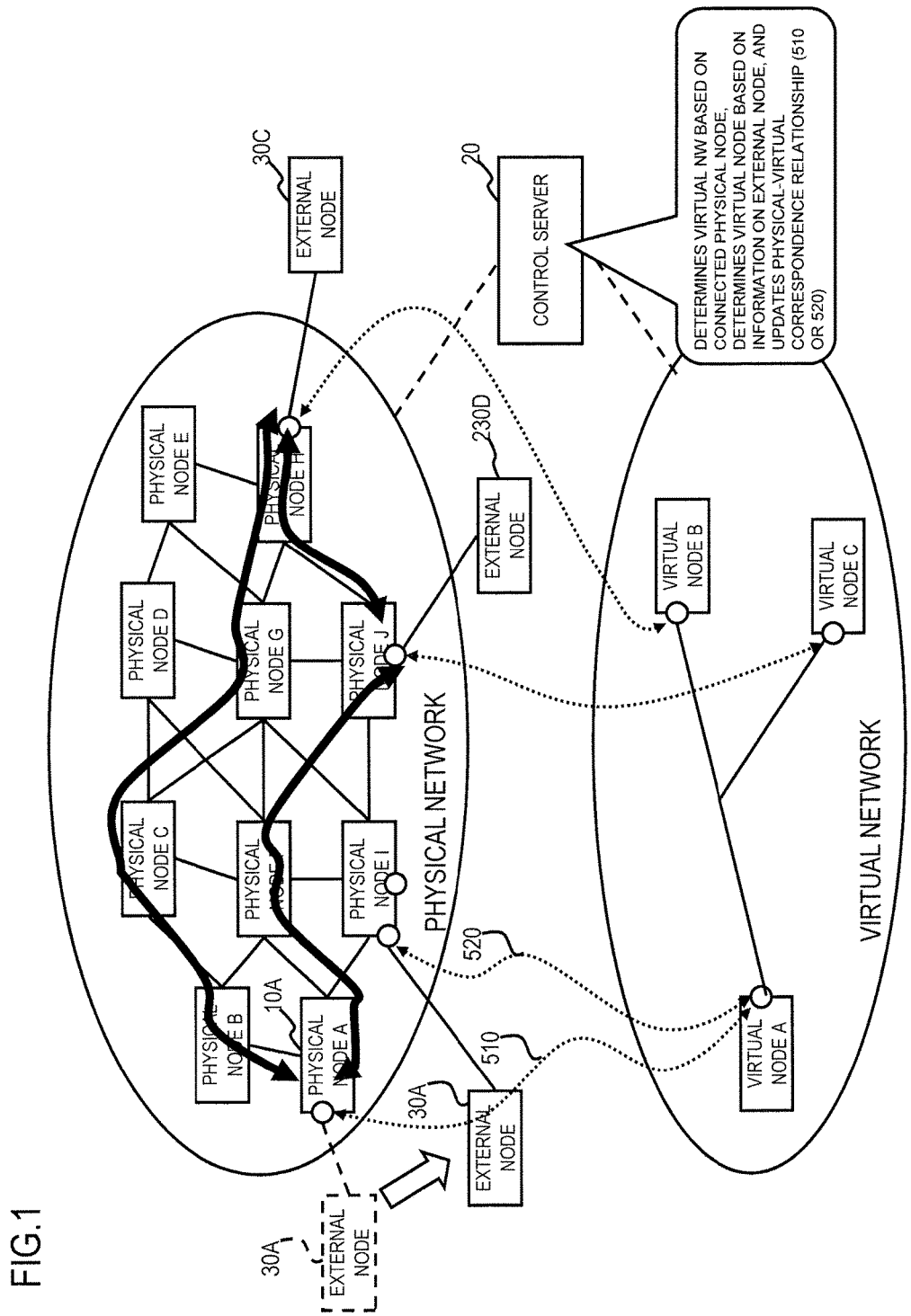
FIG. 1 is a diagram for explaining an overview of the present invention.

First, an overview of an exemplary embodiment of the present invention will be described. The present invention can be implemented by a configuration of the exemplary embodiment including a plurality of physical nodes and a control server (control apparatus) 20, as shown in FIG. 1. Each of the plurality of physical nodes processes a packet received from one of external nodes 30A to 30D according to a processing rule which associates a matching rule for identifying a flow and processing content to be applied to a packet that matches the matching rule. The control server 20 sets the processing rule in each of the plurality of physical nodes, thereby operating each of the plurality of physical nodes as virtual nodes on a virtual network which can be used by the external nodes 30A to 30D. For convenience, reference symbols in drawings appended to this overview are added to respective elements for helping understanding as an example, and are not intended to limit the present invention to the mode shown in the drawings.

More specifically, the control server 20 includes a first storage unit which defines a correspondence relationship between each of the physical nodes and one of one or more virtual networks and a second storage unit which defines a correspondence relationship between each of the external nodes and a virtual node on one of the one or more virtual networks. The control apparatus determines the virtual network and the virtual node to which the one of the external nodes is to be connected, based on information on the physical node (such as a physical node 10A in FIG. 1) to which the external node is connected and information on the external node.

According to the above-mentioned configuration, even if each physical node and a virtual node are not associated with each other in a one-to-one correspondence relationship, the virtual network and the virtual node to which the external node is connected can be uniquely determined based on information on the physical node and the external node. By adopting the configuration, the determined virtual node can be associated with the physical node of a moving destination even if the external node has moved like the external node 30A in FIG. 1, for example (refer to reference numeral 510 or 520 in FIG. 1). By performing mutual conversion between a flow on the virtual network and a flow on a physical network based on the correspondence relationship after updating, communication of the flow can be continued.

First Exemplary Embodiment

Figure 2:
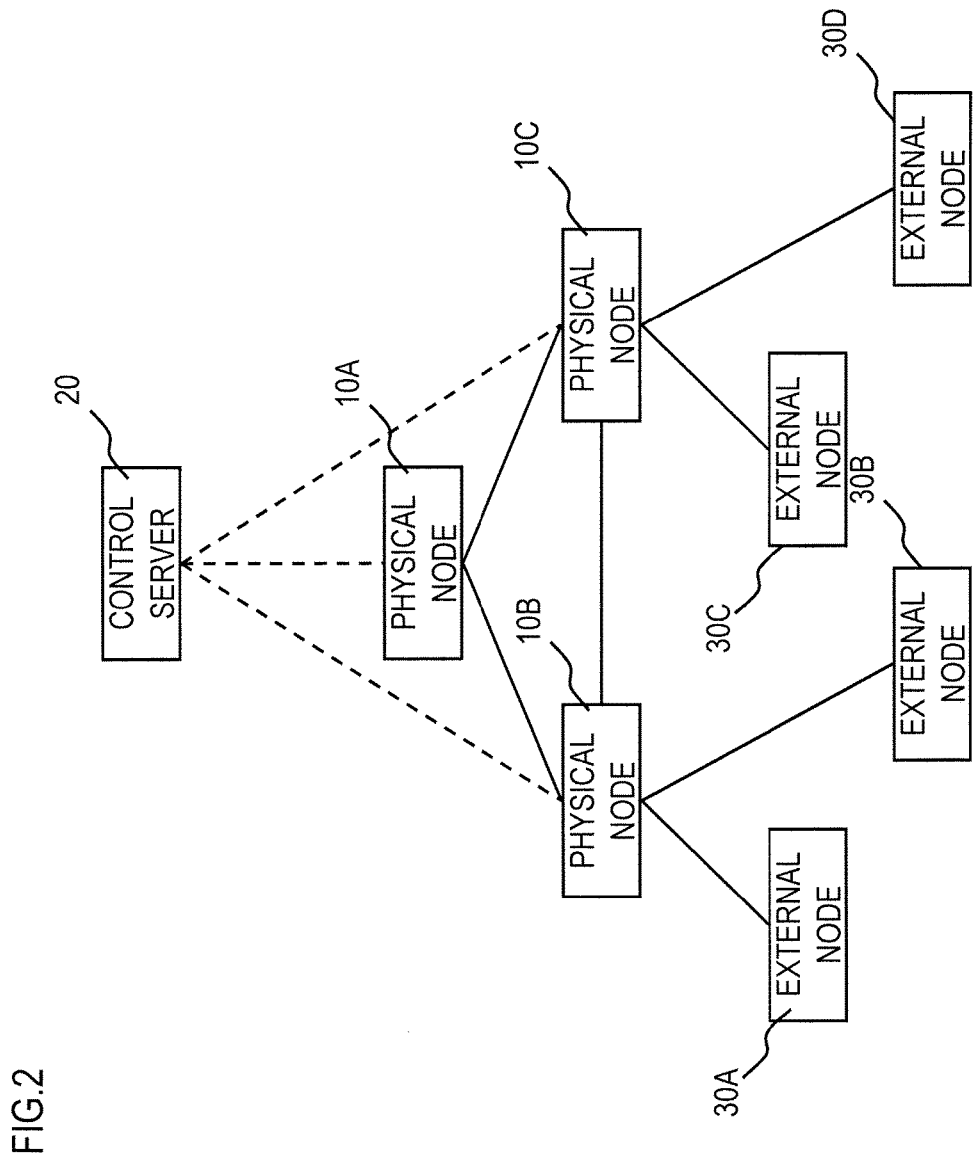
FIG. 2 is a diagram showing an overall configuration of a first exemplary embodiment of the present invention.

Next, a first exemplary embodiment of the present invention will be described in detail with reference to drawings. FIG. 2 is a diagram showing an overall configuration of the first exemplary embodiment of the present invention. Referring to FIG. 2, physical nodes 10A to 10C, a control server (control apparatus) 20 which sets a processing rule in each of these physical nodes 10A to 10C, and external nodes 30A to 30D each of which communicates with a different one of the external nodes through one of the physical nodes 10A to 10C are illustrated.

The control server 20 sets the processing rule in each of these physical nodes 10A to 10C, thereby allowing control over a packet forwarding path and allowing to cause each of the physical nodes 10A to 10C to behave as a virtual node on a virtual network recognized by a user. When a virtual server is constituted by each of the external nodes 30C and 30D, for example, the physical node 10C can be operated as a virtual load balancer by apportioning accesses from the external nodes 30A and 30B between the external nodes 30C and 30D using a predetermined algorithm.

Figure 3:
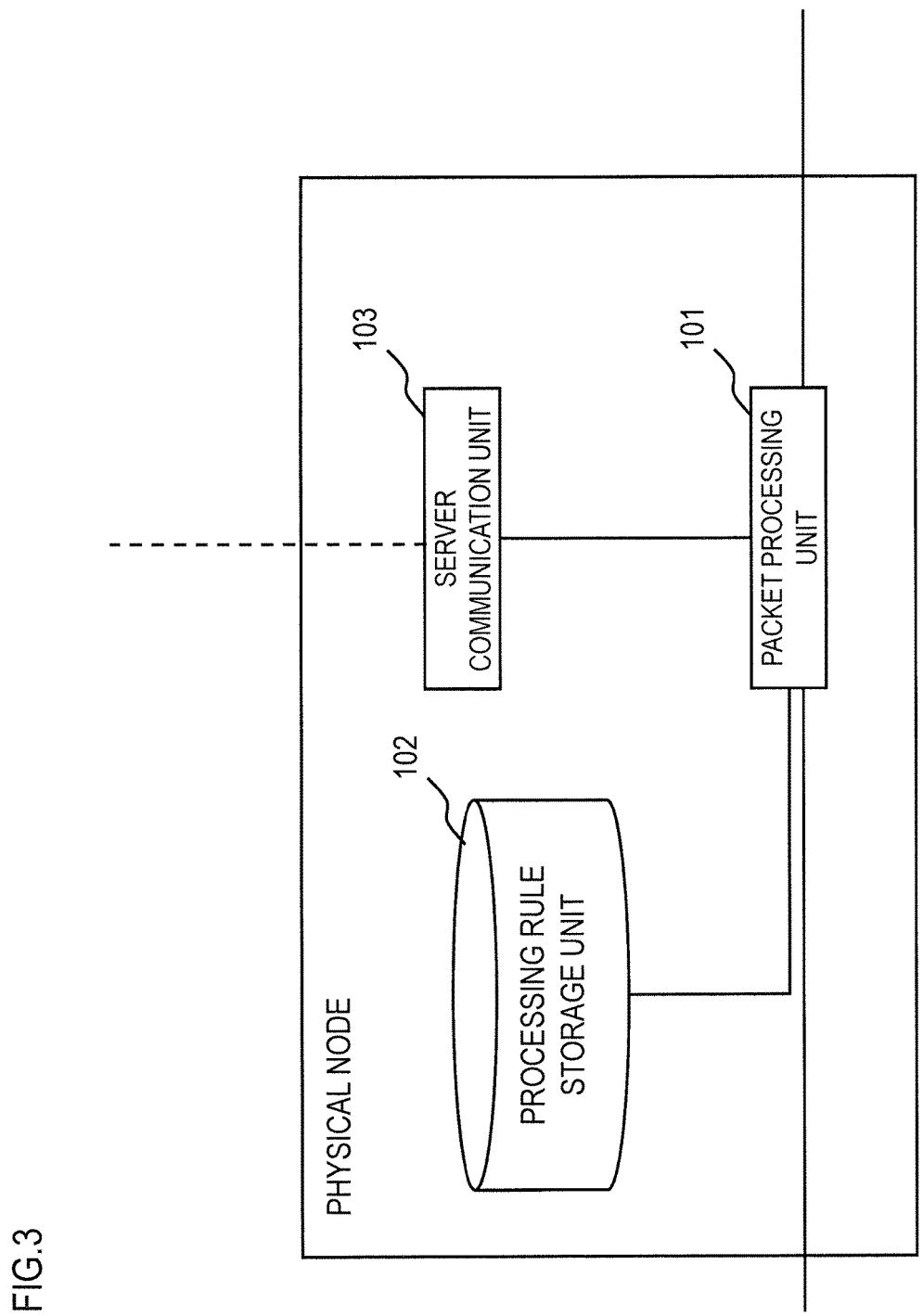
FIG. 3 is a diagram showing a configuration of a physical node in the first exemplary embodiment of the present invention.

FIG. 3 is a block diagram showing a detailed configuration of each of the physical nodes 10A to 10C (hereinafter written as a "physical node 10" and an "external node 30" when there is no particular need for making a distinction among the physical nodes and a distinction among the external nodes).

Referring to FIG. 3, there is shown the configuration of the physical node 10 including a packet processing unit 101 which processes a received packet, a processing rule storage unit 102 which holds the processing rule set by the control server 20, and a control server communication unit 103 that communicates with the control server 20.

FIG. 4 is a table for explaining processing rules 102A held in the processing rule storage unit 102. Referring to FIG. 4, each processing rule has a configuration where a matching rule for identifying a flow and processing content (action) to be applied to a packet that matches the matching rule are associated. The physical node 10 in this exemplary embodiment performs aging of each processing rule.

When receiving a packet, the packet processing unit 101 searches the processing rule storage unit 102 for a processing rule having a matching rule which matches the received packet. When the corresponding processing rule is present in the processing rule storage unit 102, the packet processing unit 101 executes processing content (such as outputting of the packet from a port #1) defined in the processing rule.

When the corresponding rule is not present in the processing rule storage unit 102 as a result of the search of the processing rule, the packet processing unit 101 asks the server communication unit 103 to make a processing rule setting request to the control server 20.

The packet processing unit 101 deletes from the processing rule storage unit 102 a processing rule for which no reception packet has been received within a set period of time (time-out value) due to the aging. The packet processing unit 101 notifies to the control server 20 the deletion from the processing rule storage unit 102 through the server communication unit 103.

The server communication unit 103 performs communication with the control server 20 for making the processing rule setting request, receipt of a processing rule, deletion of a processing rule, and the like. The processing rule setting request is made by transmitting to the control server 20 a processing rule request message including the received packet itself or information which has been extracted from the received packet and is necessary for generating a processing rule, and information which uniquely identifies the physical node 10. When receiving the processing rule from the control server 20, the server communication unit 103 stores the processing rule in the processing rule storage unit 102 through the packet processing unit 101.

The physical node 10 as mentioned above can be constituted by an OpenFlow switch that operates in a similar manner to that described above and described in Non Patent Literature 2.

Figure 5:
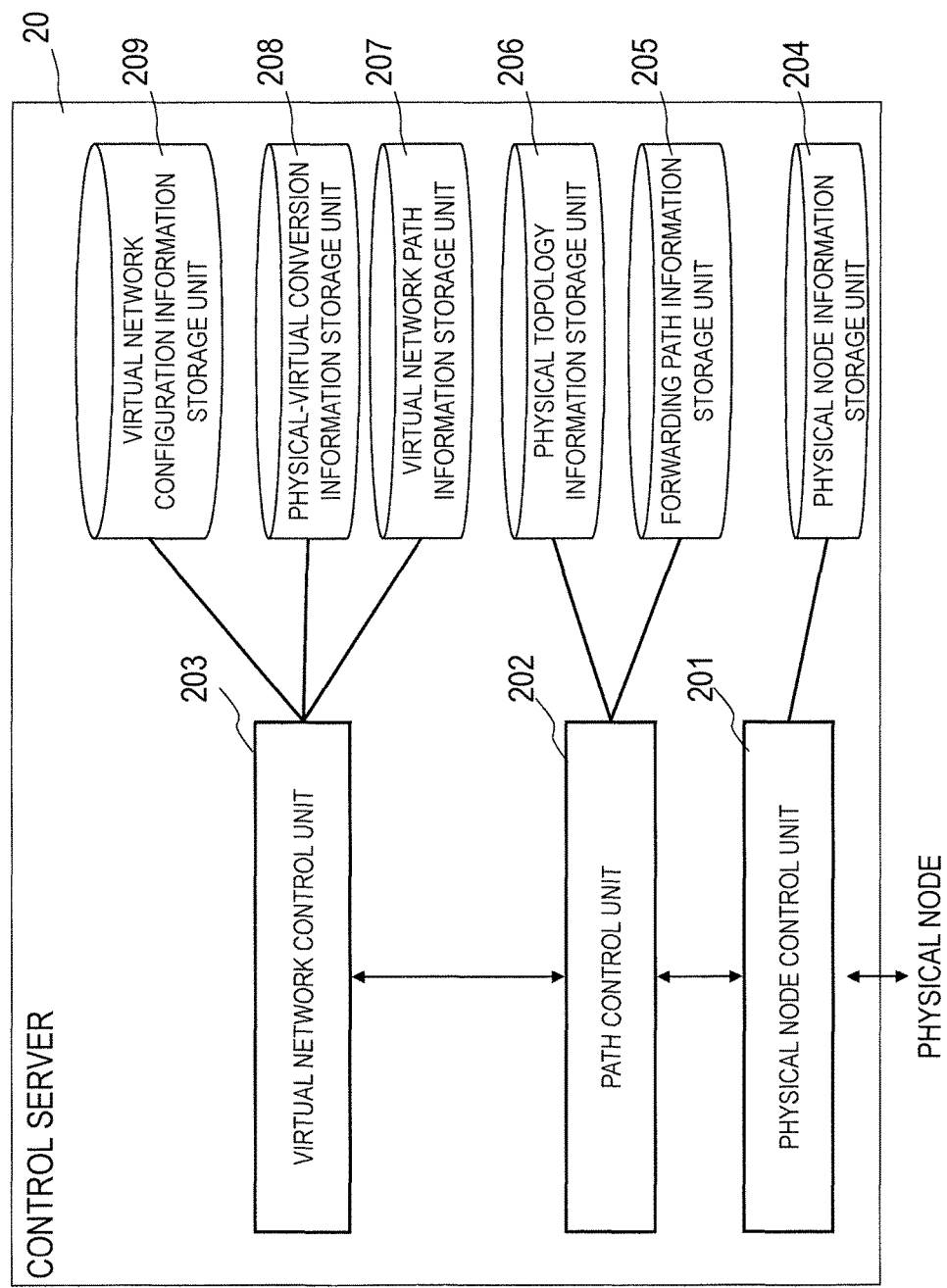
FIG. 5 is a diagram showing a configuration of a control server in the first exemplary embodiment of the present invention.

FIG. 5 is a diagram showing a detailed configuration of the control server 20 in the first exemplary embodiment of the present invention. Referring to FIG. 5, the control server 20 is constituted from a physical node control unit 201, a path control unit 202, a virtual network control unit 203, and storage units. The physical node control unit 201 controls the physical node 10 by setting a processing rule in the physical node 10. The path control unit 202 calculates a packet forwarding path based on a network topology formed by the physical nodes 10, or the like. The virtual network control unit 203 controls the virtual network constructed on the control server 20. Each of the storage units stores information to be referred to by each of these control units.

A physical node information storage unit 204 of the control server 20 is means for storing information on the physical node 10 received from the physical node 10. As such information on the physical node, a physical node ID for uniquely identifying the physical node 10, a physical port ID for uniquely identifying a physical port (interface) of the physical node 10, setting and a status of the physical port, a state of connection of the physical node 10 to the control server 20, and the like may be pointed out.

A forwarding path information storage unit 205 of the control server 20 stores a flow (physical flow) on a physical network showing a correspondence relationship between a forwarding path between the physical nodes 10 at arbitrary two points and a processing rule instructed to each physical node on the forwarding path.

A physical topology information storage unit 206 of the control server 20 stores a connection link state (network topology) among the physical nodes 10.

A virtual network path information storage unit 207 of the control server 20 stores a correspondence relationship between each flow (physical flow) on the physical network managed by the forwarding path information storage unit 205 and a flow (virtual flow) between virtual nodes at arbitrary two points on the virtual network.

A physical-virtual conversion information storage unit 208 of the control server 20 stores a correspondence relationship between physical network position information and virtual network position information. These physical network position information and virtual network position information can also be put into a correspondence relationship between each physical node and a virtual node on the virtual network. Details of the correspondence relationship will be described later in detail using FIG. 7.

Figure 6:
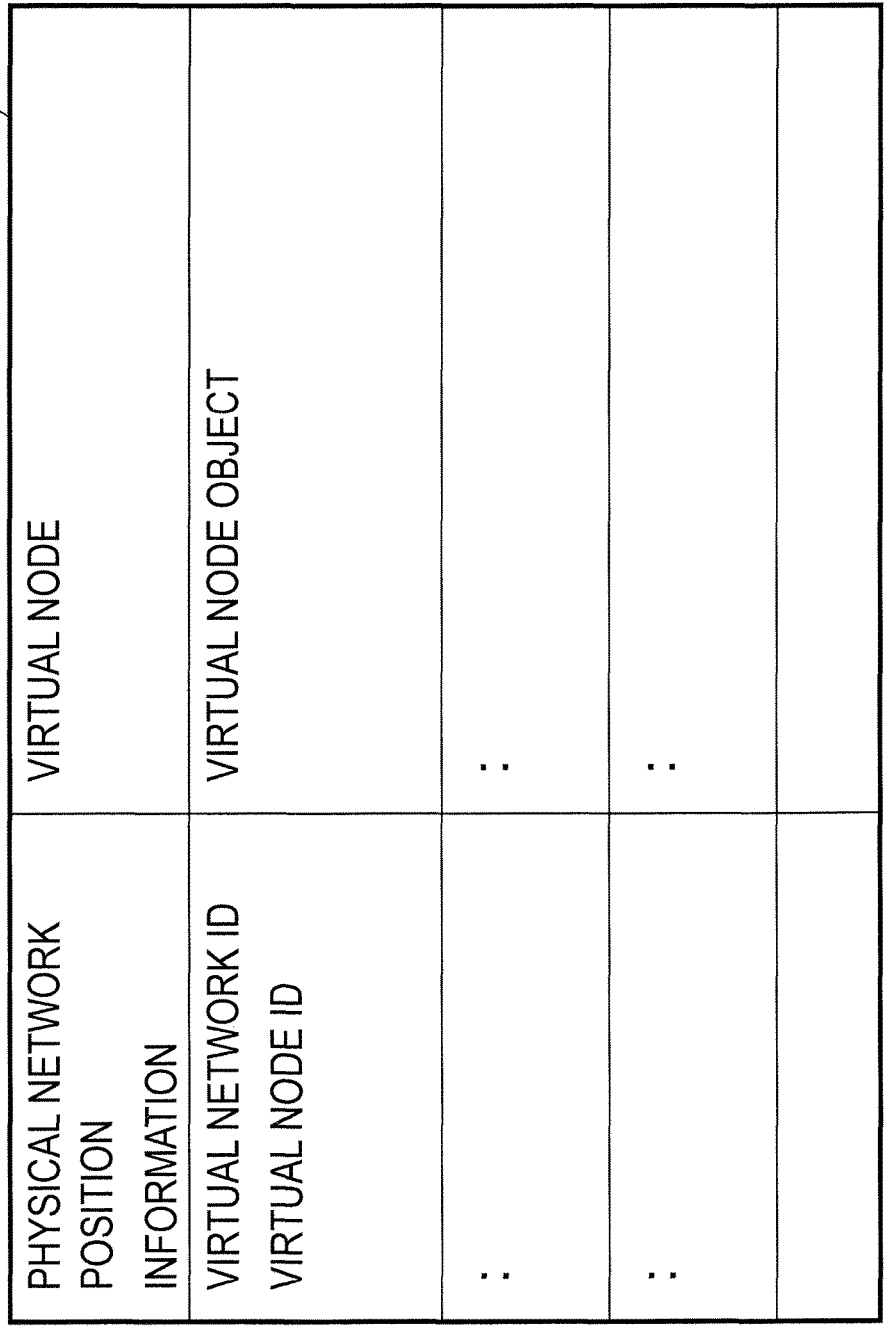
FIG. 6 is a table for explaining virtual network configuration information held in the control server in the first exemplary embodiment of the present invention.

A virtual network configuration information storage unit 209 of the control server 20 stores virtual network configuration information 209A showing a correspondence relationship among the ID of the virtual network constructed on the control server 20, a virtual node identified from the ID of the virtual node, and the virtual node object of the virtual node, as shown in FIG. 6.

Figure 7:
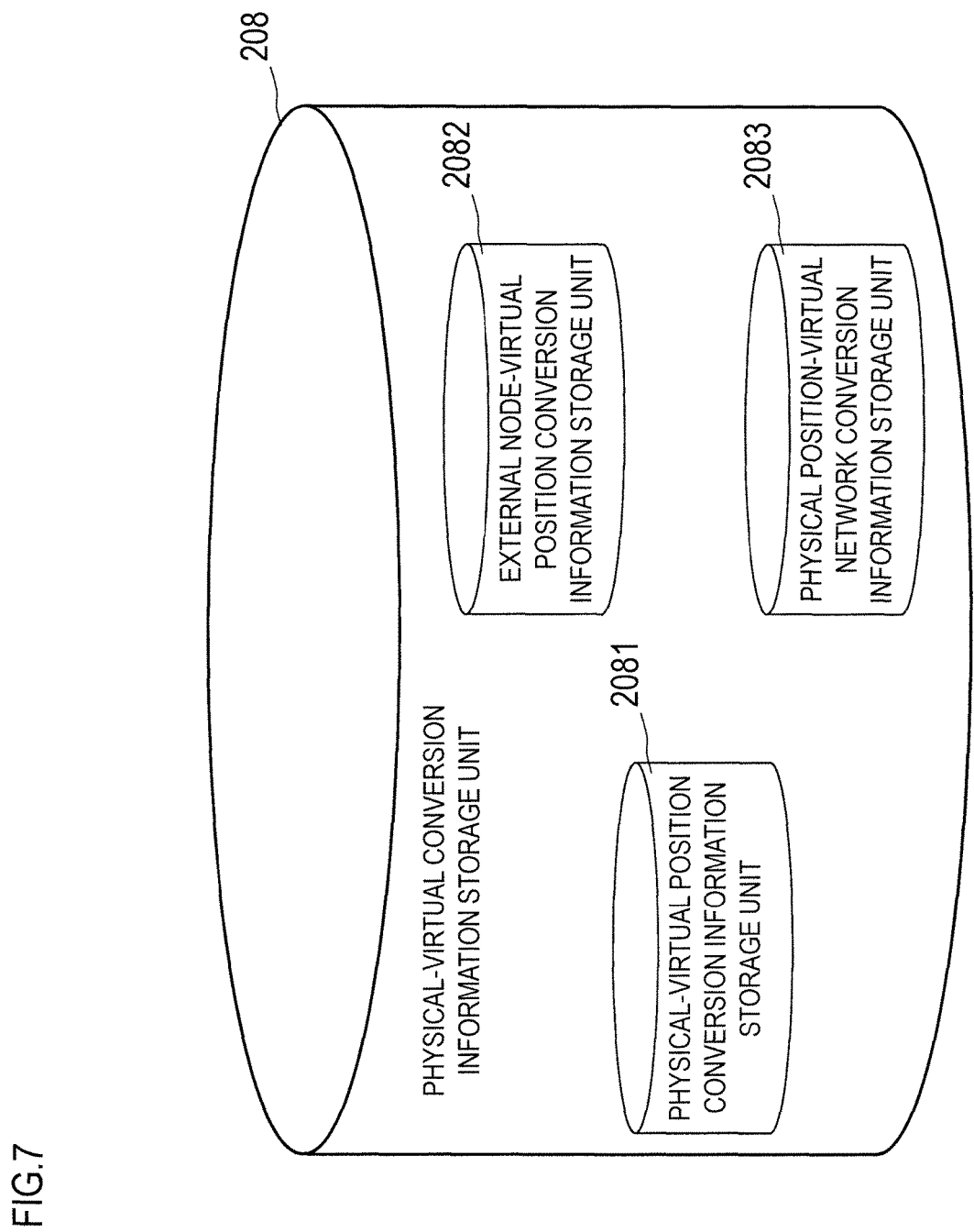
FIG. 7 is a diagram for explaining information held in a physical-virtual conversion information storage unit of the control server in the first exemplary embodiment of the present invention.

FIG. 7 is a diagram for explaining information held in the physical-virtual conversion information storage unit. Referring to FIG. 7, a configuration including a physical-virtual position conversion information storage unit (third storage unit) 2081, a physical position-virtual network conversion information storage unit (first storage unit) 2083, and an external node-virtual position conversion information storage unit (second storage unit) 2082 is shown.

The physical-virtual position conversion information storage unit 2081 holds an entry (physical-virtual position conversion information 2081A) as shown in FIG. 8, which associates a set of the physical node ID of the physical node, the physical port ID and the VLAN-TAG of the physical node with a virtual network ID, a virtual node ID, and a virtual interface ID. Hereinafter, the set of the physical node ID, the physical port ID, and the VLAN-TAG (that is not an essential item, however) will be referred to as "physical network position information", and the virtual network ID, the virtual node ID, and the virtual interface ID will be referred to as "virtual network position information".

The external node-virtual position conversion information storage unit 2082 holds an entry (external node-virtual position conversion information 2082A) as shown in FIG. 9, which associates information such as a transmission source MAC address, a transmission source IP address, or a transmission source network address for identifying the external node with the virtual network position information.

The physical position-virtual network conversion information storage unit 2083 holds an entry (physical information-virtual network conversion information 2083A) as shown in FIG. 10, which associates the physical network position information with the virtual network ID.

The physical node control unit 201 includes a function of generating the processing rule to be set in each physical node 10 on the forwarding path and setting the processing rule in each physical node 10 by referring to the information held in the physical node information storage unit 204, in response to an instruction from the path control unit 202, and a function of receiving the processing rule setting request or the notification of deletion of the processing rule received from the physical node 10 and notifying the request or the notification to the path control unit 202 and the virtual network control unit 203.

The path control unit 202 includes a function of determining the path between the physical nodes 10 at the arbitrary two points by referring to the connection link state (network topology) among the physical nodes 10 held in the physical topology information storage unit 206. The path control unit 202 also includes a function of causing the physical node control unit 201 to set the processing rule for implementing the path in each physical node 10 and constructing the flow to be communicated between the physical ports of the physical nodes 10 at the arbitrary two points. The path control unit 202 also includes a function of notifying deletion of the processing rule to the virtual network control unit 203 when receiving the notification of deletion of the processing rule from the physical node 10.

The virtual network control unit 203 includes a function of identifying the virtual network position information corresponding to the position information on the physical node 10 on the physical network and implementing transmission and reception of a packet between the physical network and the virtual network. The virtual network control unit 203 also includes a function of emulating communication on the virtual network and then determining an End-To-End communication flow between the virtual nodes at arbitrary two points of the virtual network. The virtual network control unit 203 also includes a function of converting the communication flow on the virtual network to an End-To-End communication flow between the physical nodes at arbitrary two points on the physical network, and then instructing the path control unit 202 to set a path on the physical network and set a processing rule that implements the path.

Figure 11:
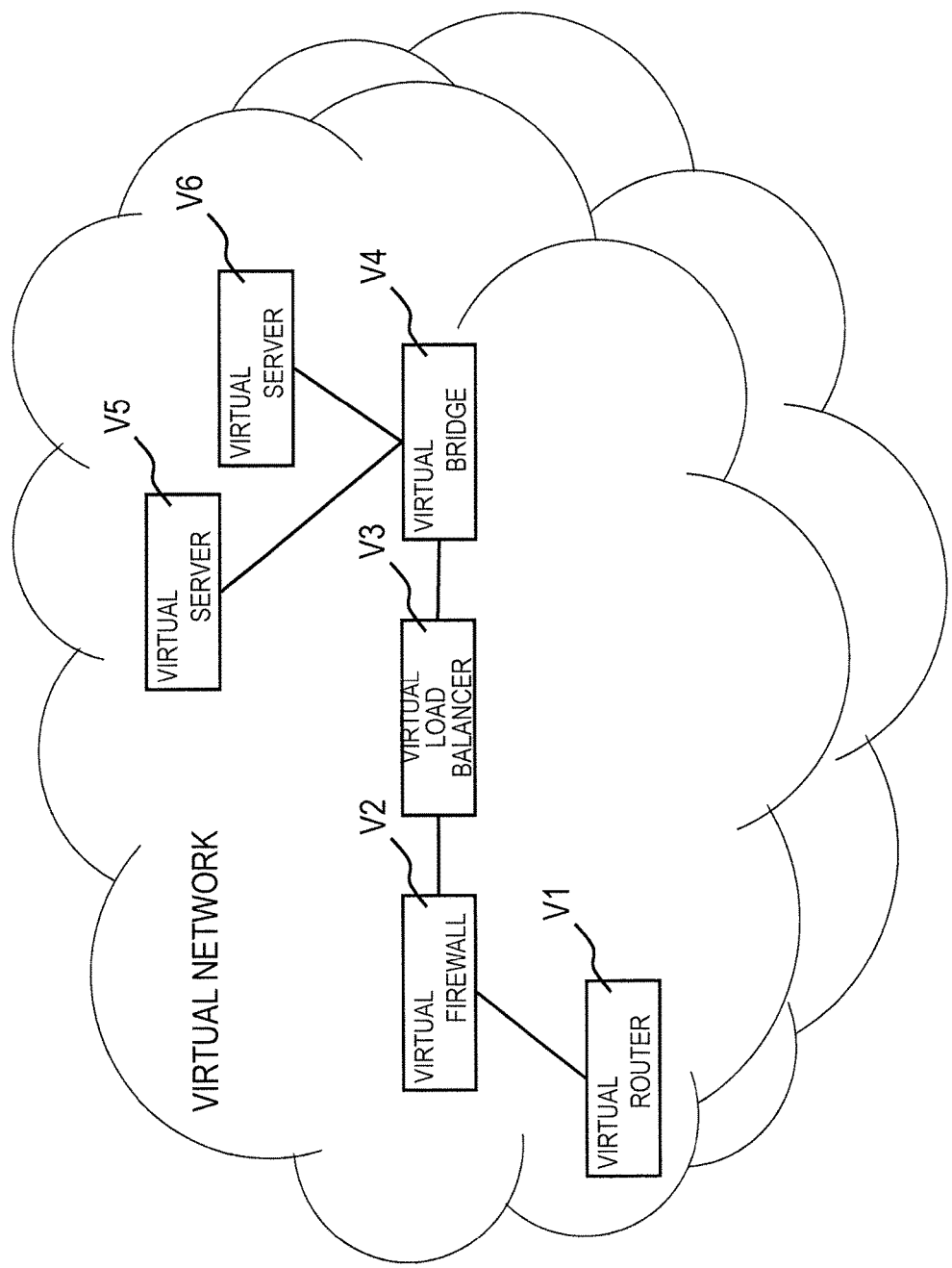
FIG. 11 shows an example of a virtual network to be implemented by the configuration of the first exemplary embodiment of the present invention.

FIG. 11 shows an example of the virtual network to be managed by the virtual network control unit 203 as described above. The virtual network is configured by using the virtual nodes such as a virtual router V1, a virtual firewall V2, a virtual load balancer V3, a virtual bridge V4, virtual servers V5 and V6, virtual interfaces belonging to these virtual nodes, and a virtual link connecting the virtual interfaces, as shown in FIG. 11.

The control server 20 as described above can also be implemented by a computer program for causing a computer constituting the control server 20 to refer to the above-mentioned information and execute each of the above-mentioned processes using hardware of the computer.

Figure 12:
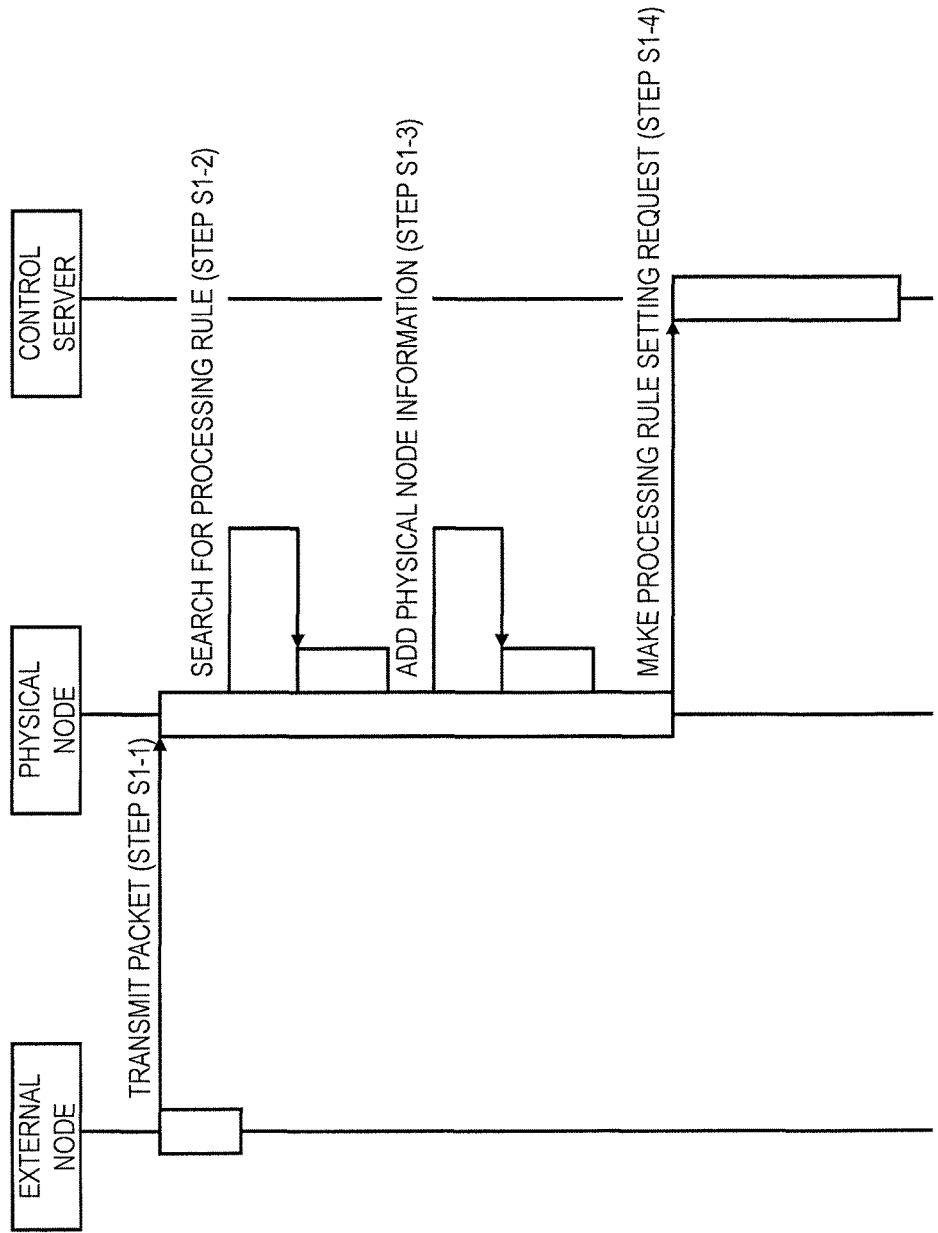
FIG. 12 is a sequence diagram showing operations of the physical node in the first exemplary embodiment of the present invention.

Next, operation of this exemplary embodiment will be described in detail with reference to drawings. FIG. 12 is a sequence diagram showing operations of the physical node that has received a packet from the external node 30. Referring to FIG. 12, when the external node (such as the external node 30A in FIG. 2) transmits the packet addressed to the different external node (such as the external node 30D in FIG. 2) (in step S1-1), the physical node 10 searches for a processing rule having a matching rule which matches the received packet (in step S1-2). It is assumed herein that the packet is a first packet addressed from the external node (such as the external node 30A in FIG. 2) to the different external node (such as the external node 30D in FIG. 2), so that the processing rule which matches the received packet is not present. Then, the physical node 10 adds the physical node ID of the physical node 10 and the physical port ID of a physical port which has received the packet to the received packet (in step S1-3), and transmits the resulting packet to the control server 20 as a processing rule setting request.

Figure 13:
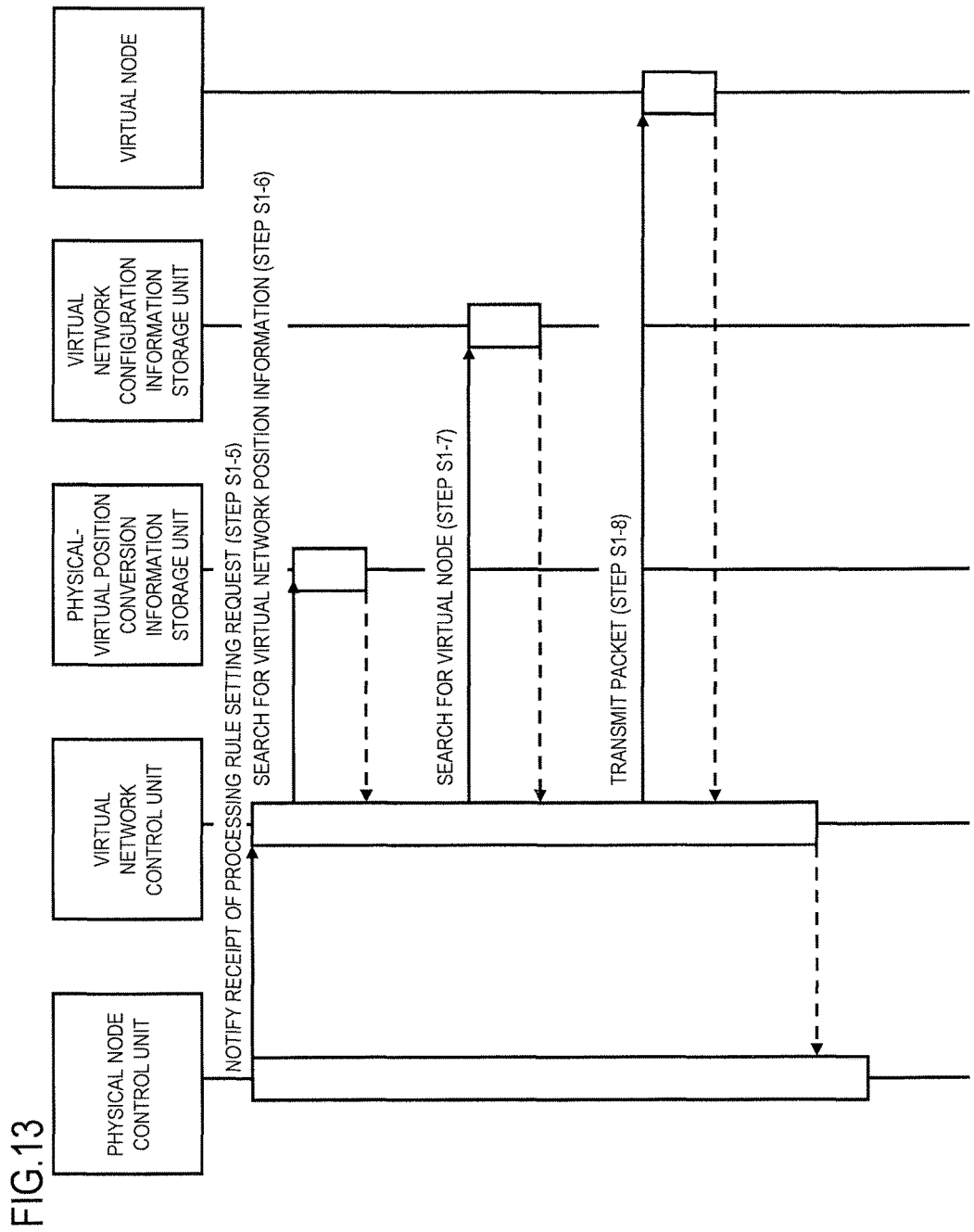
FIG. 13 is a sequence diagram showing operations of the control server in the first exemplary embodiment of the present invention.
Figure 14:
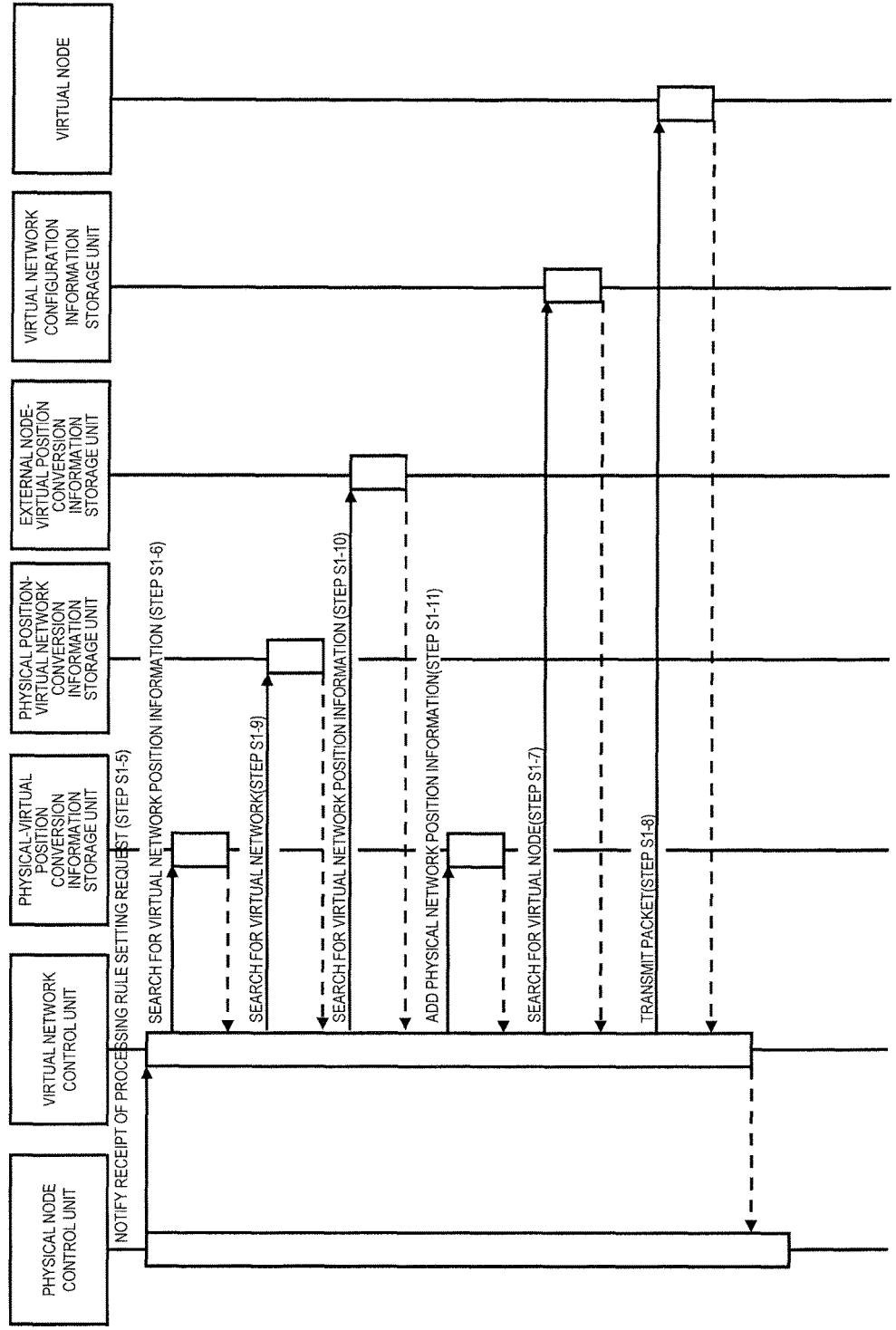
FIG. 14 is a sequence diagram showing another operations of the control server in the first exemplary embodiment of the present invention.

Each of FIGS. 13 and 14 is a sequence diagram showing operations of the control server 20 which has received the above-mentioned processing rule setting request. First, with reference to FIG. 13, a description will be given about the operations when virtual network position information corresponding to the position information on the physical node that has made the processing rule setting request is registered in the physical-virtual position conversion information storage unit 2081.

Referring to FIG. 13, the physical node control unit 201 of the control server 20 outputs the processing rule setting request received from the physical node 10 to the virtual network control unit 203 (in step S1-5).

The virtual network control unit 203 refers to the physical-virtual position information storage unit 2081 to search for the virtual network position information corresponding to the physical network position information included in the processing rule setting request (in step S1-6). Since the virtual network position information corresponding to the physical network position information is herein registered in the physical-virtual position conversion information storage unit 2081, the virtual network control unit 203 identifies the virtual node corresponding to the identified virtual network position information using the virtual network configuration information storage unit 209 (in step S1-7), and transmits the packet to the identified virtual node (physical node corresponding to the virtual node) (in step S1-8). Thereafter, processes of emulation of communication on the virtual network, calculation of an End-To-End communication flow between the virtual nodes, conversion of the calculated communication flow on the virtual network to a communication flow on the physical network, and setting of the processing rule for implementing the communication flow obtained by the conversion are performed.

Next, with reference to FIG. 14, a description will be given about the operations when the virtual network position information corresponding to the position information on the physical node that has made the processing rule setting request is not registered in the physical-virtual position conversion information storage unit 2081.

The operations up to steps S1-5 and S1-6 in FIG. 14 are the same as those described before with reference to FIG. 13. When it is found in step S1-6 that the virtual network position information corresponding to the position information on the physical node that has made the processing rule setting request is not registered, the virtual network control unit 203 refers to the physical position-virtual network conversion information storage unit 2083 to search for a virtual network ID corresponding to the physical network position information (in step S1-9).

When it is found as a result of the search that the corresponding virtual network ID is registered in the physical position-virtual network conversion information storage unit 2083, the virtual network control unit 203 further refers to the external node-virtual position conversion information storage unit 2082 to search for the virtual network position information corresponding to information for identifying the external node that is one of the transmission source MAC address, the transmission source IP address, or the transmission source network address included in the packet header of the received packet (in step S1-10).

When the virtual network position information corresponding to the information for identifying the external node is found as a result of the search, the virtual network control unit 203 adds an entry that associates the physical network position information and the virtual network position information identified from the external node-virtual position conversion information storage unit 2082 to the physical-virtual position conversion information storage unit 2081 (in step S1-11). With this arrangement, when the processing rule setting request is received again from the same physical node, a packet can be directly transmitted to the virtual node identified by referring to the physical-virtual position information storage unit 2081, according to the sequence in FIG. 13.

Since subsequent operations are the same as those in FIG. 13, description of the subsequent operations will be omitted.

Next, a description will be directed to the deletion process of an entry in the physical-virtual position conversion information storage unit 2081 when a processing rule is deleted from the physical node 10 due to aging.

Figure 15:
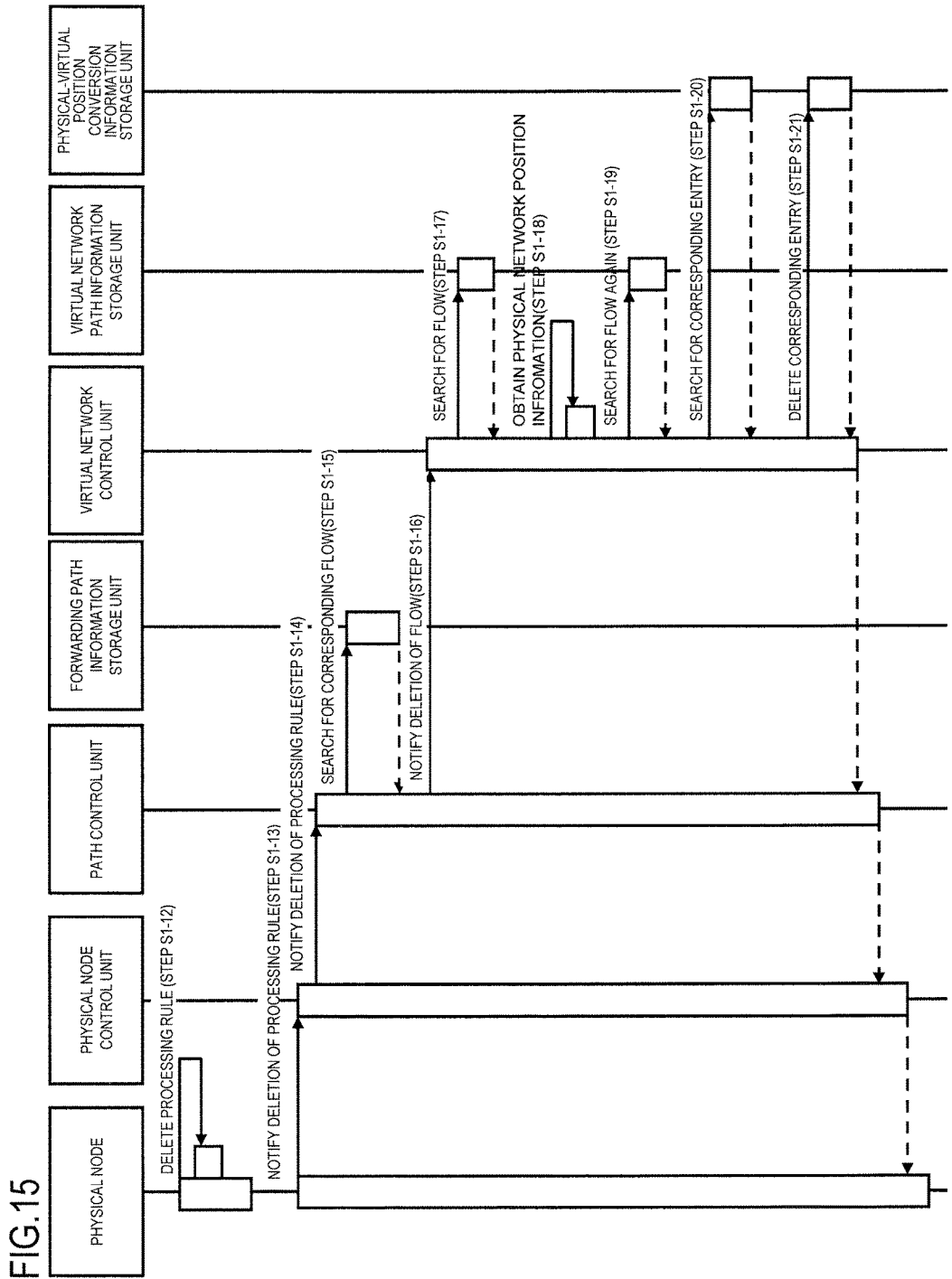
FIG. 15 is a sequence diagram showing another operations of the control server in the first exemplary embodiment of the present invention.

FIG. 15 is a sequence diagram showing a sequence of operations when the processing rule is deleted from the physical node 10 due to aging. First, when a received packet that matches one of processing rules in the processing rule storage unit 102 is not received for a given period, the physical node 10 deletes the corresponding processing rule (in step S1-12), and then notifies deletion of the processing rule to the control server 20 (in step S1-13).

The physical node control unit 201 of the control server 20 which has received the notification forwards the notification of deletion of the processing rule to the path control unit 202 (in step S1-14).

The path control unit 202 searches for a flow (physical flow) corresponding to the deleted processing rule from the forwarding path information storage unit 205 (in step S1-15), and notifies deletion of the flow to the virtual network control unit 203 (in step S1-16).

Next, the virtual network control unit 203 searches the virtual network path information storage unit 207 for a flow (virtual flow) corresponding to the notified flow (physical flow) (in step S1-17). The virtual network control unit 203 obtains physical network position information corresponding to the searched flow (physical flow for which the processing rule has been deleted) through the path control unit 202 (in step S1-18).

The virtual network control unit 203 searches the virtual network path information storage unit 207 for another flow (virtual flow) involving the obtained physical network position information (step S1-19).

Next, the virtual network control unit 203 searches the physical-virtual position conversion information storage unit 2081 for a physical position-virtual position conversion information entry that associates the physical network position information and virtual network position information (in step S1-20).

Finally, the virtual network control unit 203 deletes the searched physical-virtual position conversion information entry immediately or after a certain period of time (in step S1-21).

As described above, when deletion of the processing rule is performed at the physical node 10, the physical-virtual position conversion information held by the control server 20 is deleted, in response to this deletion.

Next, a description will be directed to operations when the external node 30 that was connected to the physical node (such as the physical node 10A in FIG. 2) and made it possible to transmit a packet to the virtual node on the virtual network as described above has moved.

When the external node 30 has moved, the physical port of another one of the physical nodes that receives a packet from the external node 30 is changed. Then, the external node 30 transmits a GARP (Gratuitous Address Resolution Protocol) packet to the another one of the physical nodes (such as the physical node 10B in FIG. 2).

The physical node 10 that has received the GARP packet transmits a processing rule setting request to the control server 20 according to the sequence shown in FIG. 12.

Figure 16:
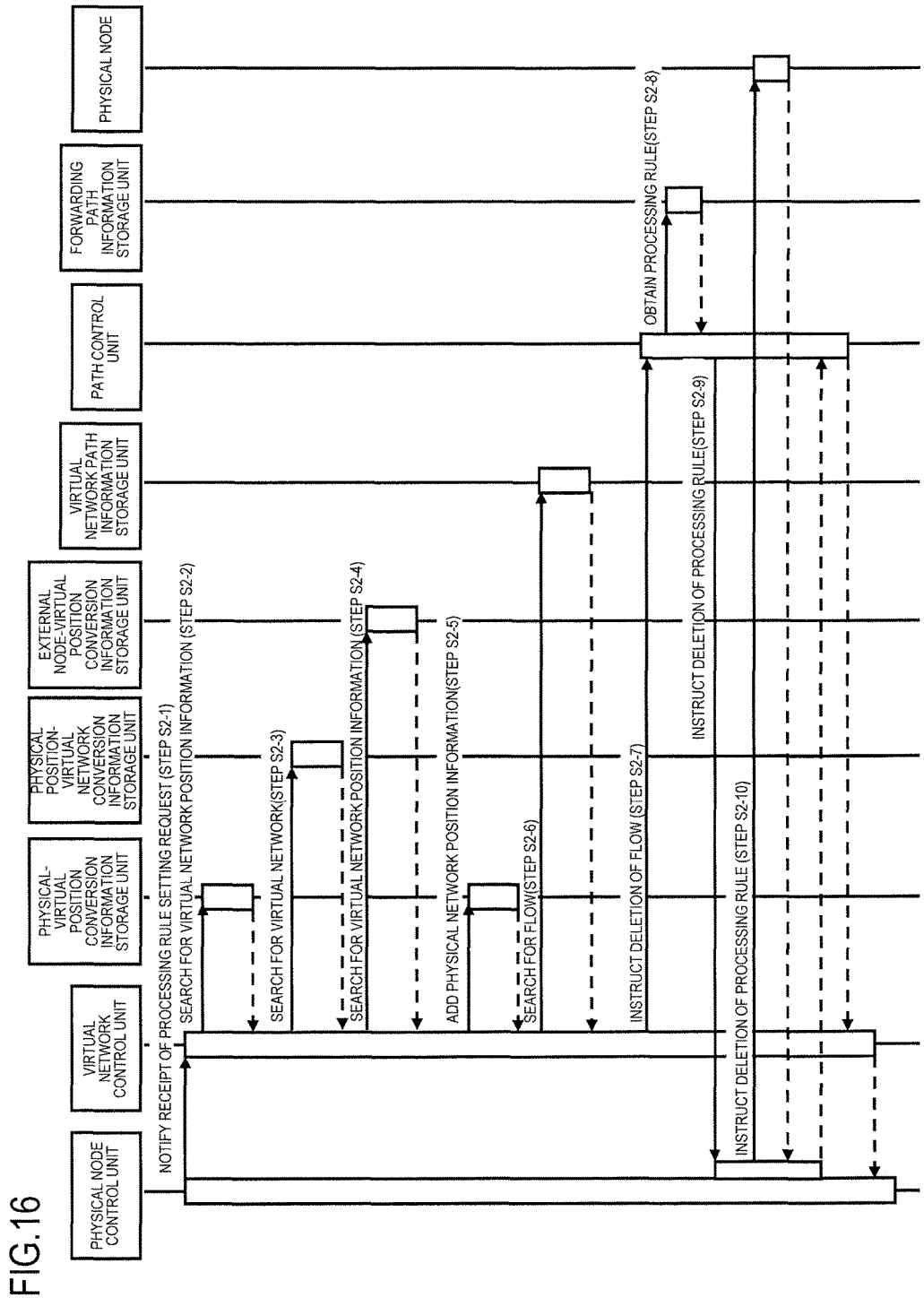
FIG. 16 is a sequence diagram showing another operations of the control server in the first exemplary embodiment of the present invention (when an external node has moved).

FIG. 16 is a sequence diagram showing operations of the control server which has received the processing rule setting request with respect to the GARP packet transmitted from the above-mentioned external node that has moved.

Referring to FIG. 16, the physical node control unit 201 of the control server 20 first outputs the processing rule setting request received from the physical node 10 to the virtual network control unit 203 (in step S2-1).

The virtual network control unit 203 refers to the physical-virtual position conversion information storage unit 2081 to search for virtual network position information corresponding to physical network position information included in the processing rule setting request (in step S2-2). Herein, the virtual network position information corresponding to the physical network position information is not registered in the physical-virtual position conversion information storage unit 2081 due to movement of the external node. Thus, the virtual network control unit 203 refers to the physical position-virtual network conversion information storage unit 2083 to search for a virtual network ID corresponding to the physical network position information (in step S2-3).

Herein, the external node 30 was using the virtual network until the external node 30 has moved. Thus, the virtual network ID corresponding to the physical network position information is registered in the physical position-virtual network conversion information storage unit 2083. Then, the virtual network control unit 203 further refers to the external node-virtual position conversion information storage unit 2082 to search for virtual network position information corresponding to information for identifying the external node that is one of the transmission source MAC address, the transmission source IP address and the transmission source network address (in step S2-4).

When the virtual network position information corresponding to the information for identifying the external node is found as a result of the search, the virtual network control unit 203 adds an entry that associates the physical network position information and the virtual network position information identified from the external node-virtual position conversion information storage unit 2082 to the physical-virtual position conversion information storage unit 2081 (in step S2-5).

When an entry that associates physical network position information corresponding to the identified virtual network position information is already present in the physical-virtual position conversion information storage unit 2081 in this case, the virtual network control unit 203 determines that the external node 30 has moved, and then refers to the virtual network path information storage unit 207 to search for a flow (virtual flow) associated with the physical network position information, (in step S2-6).

When the flow (virtual flow) is found as a result of the search, the virtual network control unit 203 instructs the path control unit 202 to delete a flow (physical flow) associated with the flow (virtual flow) (in step S2-7).

The path control unit 202 refers to the forwarding path information storage unit 205 to obtain a series of processing rules for implementing the flow (physical flow) (in step S2-8).

The path control unit 202 instructs deletion of all of the processing rules to the physical node control unit 201 (in step S2-9).

Finally, the physical node control unit 201 instructs the physical nodes 10 which hold the processing rules instructed to be deleted to delete these processing rules (in step S2-10). Thereafter, processes similar to those in steps S1-12 to S1-21 in FIG. 15 are performed.

As described above, according to this exemplary embodiment, the physical network position information and the virtual network position information are dynamically associated, thereby making it possible to eliminate the need for setting the physical port of the physical node that connects the external node in advance. Further, according to this exemplary embodiment, even if the external node 30 has physically moved, communication on the virtual network can be continued, as described above.

Though the above description was directed to each exemplary embodiment, the present invention is not limited to the above-mentioned exemplary embodiment. Further variation, substitution, and adjustment are possible within the technical concept of the present invention. The numbers of the physical nodes and the virtual nodes disclosed in the above-mentioned exemplary embodiment are exemplified in order to briefly explain the present invention, and are not of course limited to these numbers.

Similarly, the description was given, assuming that one virtual network is formed in the above-mentioned exemplary embodiment. The number of the virtual networks is not, however, limited to one in particular.

Finally, the preferred exemplary embodiments of the present invention will be summarized.

First Exemplary Embodiment

See the information system in the first aspect described above.

Second Exemplary Embodiment

Preferably, upon receipt of a request for setting the processing rule from the physical node, the control apparatus determines the virtual network and the virtual node to which the external node is to be connected, based on information on the physical node that has transmitted the request for setting the processing rule and information on the external node included in the request for setting the processing rule.

Third Exemplary Embodiment

Preferably, the control apparatus further comprises:

a third storage unit which stores a correspondence relationship among the physical node, the determined virtual network and the determined virtual node; and when receiving the request for setting the processing rule from the physical node, the control apparatus refers to the third storage unit, and then when a corresponding entry may not be able to be discovered, the control apparatus refers to the first and second storage units to determine the virtual network and the virtual node to which the external node is to be connected, and then stores in the third storage unit the correspondence relationship among the physical node, the determined virtual network, and the determined virtual node.

Fourth Exemplary Embodiment

Preferably, virtual network association is made for each interface of each of the plurality of physical nodes in the first storage unit; and the control apparatus makes virtual network determination according to the interface of the physical node that has received a packet related to a request for setting the processing rule.

Fifth Exemplary Embodiment

Preferably, in the second storage unit, information on the virtual node on the virtual network and a virtual interface of the virtual node is associated, for each of the one or more external nodes; and the control apparatus treats the external node as being connected to the virtual node on the virtual network through the virtual interface.

Sixth Exemplary Embodiment

See the control apparatus in the second aspect described above.

Seventh Exemplary Embodiment

See the method of providing a virtual network in the third aspect described above.

Eighth Exemplary Embodiment

See the program in the fourth aspect described above.
Each component and each step of the method of providing a virtual network and the program can be similarly developed into the second to sixth exemplary embodiments, like the information system in the first exemplary embodiment. Each disclosure of the above-listed Patent Literature and Non Patent Literatures is incorporated herein by reference. Modification and adjustment of each exemplary embodiment are possible within the scope of the overall disclosure (including the claims) of the present invention and the technical concept of the present invention. Various combinations and selections of various disclosed elements (including each element in each claim, each element in each exemplary embodiment, and each element in each drawing) are possible within the scope of the claims of the present invention. That is, the present invention includes various variations and modifications that could be made by those skilled in the art according to the overall disclosure including the claims and the technical concept.

REFERENCE SIGNS LIST 10, 10A-10C physical node
20 control server (control apparatus)
30, 30A-30D external node
101 packet processing unit
102 processing rule storage unit
103 server communication unit
201 physical node control unit
202 path control unit
203 virtual network control unit
204 physical node information storage unit
205 forwarding path information storage unit
206 physical topology information storage unit
207 virtual network path information storage unit
208 physical-virtual conversion information storage unit
209 virtual network configuration information storage unit
2081 physical-virtual position conversion information storage unit (third storage unit)
2082 external node-virtual position conversion information storage unit (second storage unit)
2083 physical position-virtual network conversion information storage unit (first storage unit)

What is claimed is:

1. An information system comprising:

a plurality of physical nodes each of which processes a packet received from one of one or more external nodes according to a packet handling operation that associates a matching rule for identifying a flow and an action for processing the received packet; and a control apparatus which sets the packet handling operation in each of the plurality of physical nodes according to a virtual network of one or more virtual networks; wherein the virtual network comprises a plurality of virtual nodes and provides a plurality of network appliance functions, each of the plurality of virtual nodes performing one of the network appliance functions as a virtual network appliance, and the control apparatus comprises:

a first storage unit which defines a correspondence relationship between each of the plurality of physical nodes and one of one or more virtual networks;

a second storage unit which defines a correspondence relationship between each of the one or more external nodes and a virtual node on one of the one or more virtual networks; and a physical node setting unit which sets the packet handling operation in each of the physical nodes to emulate virtual nodes;

the control apparatus determining the virtual network(s) based on one or more connections between the physical node(s) and determining the virtual node(s) to which the one or more external nodes are to be connected, based on information on the physical node(s) to which the external node(s) is (are) connected and address information of the external node(s);

wherein each of the control apparatus, the first storage unit and the second storage unit are implemented at least via a CPU.

2. The information system according to claim 1, wherein upon receipt of (a) request(s) for setting the packet handling operation from the physical node(s), the control apparatus determines the virtual network(s) and the virtual node(s) to which the external node(s) is (are) to be connected, based on information on the physical node(s) that has (have) transmitted the request for setting the packet handling operation and information on the external node(s) included in the request for setting the packet handling operation.

3. The information system according to claim 2, wherein the control apparatus further comprises:

a third storage unit which stores a correspondence relationship among the physical node(s), the determined virtual network and the determined virtual node(s); and when receiving the request for setting the packet handling operation from the physical node(s), the control apparatus refers to the third storage unit, and then when a corresponding entry may not be able to be discovered, the control apparatus refers to the first and second storage units to determine the virtual network and the virtual node(s) to which the external node is (are) to be connected, and then stores in the third storage unit the correspondence relationship among the physical node(s), the determined virtual network, and the determined virtual node(s);

wherein the third storage unit is implemented at least via a CPU.

4. The information system according to claim 2, wherein virtual network association is made for each interface of each of the plurality of physical nodes in the first storage unit; and the control apparatus makes virtual network determination according to the interface(s) of the physical node(s) that has (have) received a packet related to a request for setting the packet handling operation.

5. The information system according to claim 1, wherein the control apparatus further comprises:

a third storage unit which stores a correspondence relationship among the physical node(s), the determined virtual network and the determined virtual node(s); and when receiving the request for setting the packet handling operation from the physical node(s), the control apparatus refers to the third storage unit, and then when a corresponding entry may not be able to be discovered, the control apparatus refers to the first and second storage units to determine the virtual network and the virtual node(s) to which the external node is to be connected, and then stores in the third storage unit the correspondence relationship among the physical node(s), the determined virtual network, and the determined virtual node(s);

wherein the third storage unit is implemented at least via a CPU.

6. The information system according to claim 5, wherein virtual network association is made for each interface of each of the plurality of physical nodes in the first storage unit; and the control apparatus makes virtual network determination according to the interface(s) of the physical node(s) that has (have) received a packet related to a request for setting the packet handling operation.

7. The information system according to claim 1, wherein virtual network association is made for each interface of each of the plurality of physical nodes in the first storage unit; and the control apparatus makes virtual network determination according to the interface(s) of the physical node(s) that has (have) received a packet related to a request for setting the packet handling operation.

8. The information system according to claim 1, wherein in the second storage unit, information on the virtual node on the virtual network and a virtual interface of the virtual node is associated, for each of the one or more external nodes; and the control apparatus treats the external node as being connected to the virtual node on the virtual network through the virtual interface.

9. The information system according to claim 1, wherein a network appliance function of the plurality of network appliance functions is a virtual router.

10. The information system according to claim 1, wherein a network appliance function of the plurality of network appliance functions is a virtual firewall.

11. The information system according to claim 1, wherein a network appliance function of the plurality of network appliance functions is a virtual load balancer.

12. The information system according to claim 1, wherein a network appliance function of the plurality of network appliance functions is a virtual bridge.

13. The information system according to claim 1, wherein a network appliance function of the plurality of network appliance functions is a virtual server.

14. A control apparatus, wherein the control apparatus is connected to a plurality of physical nodes each of which processes a packet received from one of one or more external nodes according to a processing rule that associates a matching rule for identifying a flow and an action for processing the received packet; and a virtual network, of one or more virtual networks, comprising a plurality of virtual nodes and that provides a plurality of network appliance functions, each of the plurality of virtual nodes performing one of the network appliance functions as a virtual network appliance, the control apparatus comprises:

a first storage unit that defines a correspondence relationship between each of the plurality of physical nodes and one of one or more virtual networks; and a second storage unit that defines a correspondence relationship between each of the one or more external nodes and a virtual node on one of the one or more virtual networks;

the control apparatus determining the virtual network(s) based on one or more connections between the physical node(s) and determining the virtual node(s) to which the one of the one or more external nodes are to be connected, based on information on the physical node(s) to which the external node(s) is (are) connected and address information of the external node;

the control apparatus setting the processing rule in each of the plurality of physical nodes including the physical node(s) corresponding to the virtual node(s) to emulate virtual nodes on the virtual network that may be used by the one or more external nodes;

wherein each of the control apparatus, the first storage unit and the second storage unit are implemented at least via a CPU.

15. The control apparatus according to claim 14, wherein upon receipt of a request for setting the packet handling operation from the physical node(s), the control apparatus determines the virtual network(s) and the virtual node(s) to which the external node(s) is (are) to be connected, based on information on the physical node(s) that has (have) transmitted the request for setting the packet handling operation and information on the external node(s) included in the request for setting the packet handling operation.

16. The control apparatus according to claim 15, wherein the control apparatus further comprises:

a third storage unit which stores a correspondence relationship among the physical node(s), the determined virtual network and the determined virtual node(s); and when receiving the request for setting the packet handling operation from the physical node(s), the control apparatus refers to the third storage unit, and then when a corresponding entry may not be able to be discovered, the control apparatus refers to the first and second storage units to determine the virtual network(s) and the virtual node(s) to which the external node(s) is (are) to be connected, and then stores in the third storage unit the correspondence relationship among the physical node, the determined virtual network(s), and the determined virtual node(s);

wherein the third storage unit is implemented at least via a CPU.

17. The control apparatus according to claim 15, wherein virtual network association is made for each interface of each of the plurality of physical nodes in the first storage unit; and the control apparatus makes virtual network determination according to the interface(s) of the physical node(s) that has (have) received a packet related to a request for setting the packet handling operation.

18. The control apparatus according to claim 15, wherein in the second storage unit, information on the virtual node(s) on the virtual network(s) and (a) virtual interface(s) of the virtual node(s) is associated, for each of the one or more external nodes; and the control apparatus treats the external node as being connected to the virtual node on the virtual network through the virtual interface.

19. The control apparatus according to claim 14, wherein the control apparatus further comprises:

a third storage unit which stores a correspondence relationship among the physical node(s), the determined virtual network and the determined virtual node(s); and when receiving the request for setting the packet handling operation from the physical node(s), the control apparatus refers to the third storage unit, and then when a corresponding entry may not be able to be discovered, the control apparatus refers to the first and second storage units to determine the virtual network(s) and the virtual node(s) to which the external node(s) is (are) to be connected, and then stores in the third storage unit the correspondence relationship among the physical node, the determined virtual network(s), and the determined virtual node(s);

wherein the third storage unit is implemented at least via a CPU.

20. The control apparatus according to claim 19, wherein virtual network association is made for each interface of each of the plurality of physical nodes in the first storage unit; and the control apparatus makes virtual network determination according to the interface(s) of the physical node(s) that has (have) received a packet related to a request for setting the packet handling operation.

21. The control apparatus according to claim 19, wherein in the second storage unit, information on the virtual node(s) on the virtual network(s) and (a) virtual interface(s) of the virtual node(s) is associated, for each of the one or more external nodes; and the control apparatus treats the external node as being connected to the virtual node on the virtual network through the virtual interface.

22. The control apparatus according to claim 14, wherein virtual network association is made for each interface of each of the plurality of physical nodes in the first storage unit; and the control apparatus makes virtual network determination according to the interface(s) of the physical node(s) that has (have) received a packet related to a request for setting the packet handling operation.

23. The control apparatus according to claim 22, wherein in the second storage unit, information on the virtual node(s) on the virtual network(s) and (a) virtual interface(s) of the virtual node(s) is associated, for each of the one or more external nodes; and the control apparatus treats the external node as being connected to the virtual node on the virtual network through the virtual interface.

24. The control apparatus according to claim 14, wherein in the second storage unit, information on the virtual node(s) on the virtual network(s) and (a) virtual interface(s) of the virtual node(s) is associated, for each of the one or more external nodes; and the control apparatus treats the external node as being connected to the virtual node on the virtual network through the virtual interface.

25. A method of providing a virtual network, wherein the method comprises:

using a control apparatus connected to a plurality of physical nodes, each of which processes a packet received from one of one or more external nodes according to a packet handling operation that associates a matching rule for identifying a flow and an action for processing the received packet; the method comprising the steps of:

determining the virtual network(s) based on one or more connections between the physical node(s) and determining the virtual node(s) to which the one of the one or more external nodes is to be connected, based on information on the physical node(s) to which the external node(s) is connected and address information of the external node(s) by referring to a first storage unit which defines a correspondence relationship between each of the plurality of physical nodes and one of one or more virtual networks and a second storage unit which defines a correspondence relationship between each of the one or more external nodes and a virtual node(s) on one of the one or more virtual networks; and causing the plurality of the physical nodes to emulate virtual nodes on the virtual network that may be used by the one or more external nodes by setting the packet handling operation in each of the plurality of physical nodes including the physical node corresponding to the virtual node(s);

wherein the virtual network provides a plurality of network appliance functions, each of the virtual nodes performing one of the network appliance functions as a virtual network appliance.

* * * * *